2,827,439
PAINT REMOVER

Ben Helper, Lakewood, and William Gordon, Cleveland Heights, Ohio

No Drawing. Application May 5, 1955
Serial No. 506,385

2 Claims. (Cl. 252—159)

This invention relates to improvements in a paint remover and more particularly to a remover which acts in such a manner that the old paint may be washed off with a stream of water.

One of the objects of the present invention is to provide a novel inexpensive and efficient remover of oil paint applicable to many different kinds of painted surfaces and adapted to remove a single coat or multiple coats of old paint with a minimum of effort.

Other objects and advantages of our invention will be apparent from the accompanying specification and the essential features will be set forth in the appended claims.

Old methods of removing paint by grinding or sanding have proved to be unsatisfactory because they require a lot of work, are effective only on flat surfaces, and are ineffective and dirty.

Most liquid paint removers known to us have a softening effect upon the old paint but require additional scraping in order to remove the paint entirely from the surface.

We have found that a certain mixture of ingredients put together with very little variation from the percentages hereinafter mentioned provides a very efficient paint remover which requires only that the material be brushed or sprayed upon the surfaces to be treated, allowed to stand a few hours, and then washed off with a stream of water, even cold water being sufficient for our purpose. This simple treatment leaves the coated surface bare of the old paint layers and is far cheaper and simpler than any other paint removal treatment known to us.

Our paint remover is compounded of the following materials:

| | Percent |
|---|---|
| Caustic soda | 21.80 |
| Ethylene glycol monobutyl ether | 5.51 |
| Methylene chloride | 8.13 |
| Sodium oxalate | 2.06 |
| Sodium alkyl sulphonate | 1.28 |
| Methyl cellulose | .79 |
| Straw oil | 3.12 |
| Cornstarch | 1.28 |
| Balance—Water. | |

The sodium alkyl sulphonate is added as a wetting agent. Applicants have used sodium keryl benzene sulphonate.

The cornstarch is added as a thickener and may be substituted by another starch, or by flour so that the compound has a thin pasty consistency and is suitable for brush or spray application to the treated surface without further additions.

The methyl cellulose is added as a thickener and as an adhesive. A small amount of common glue might be used as a thickener so that the compound will flow readily under a brush and be free from drag, and will stand on a vertical panel for fifteen minutes without any observable sagging or running.

The straw oil is a cheap paraffin oil and may be substituted by any cheap petroleum hydrocarbon oil such as is commonly used for the lubrication of automotive engines.

The complete composition should have pH value not to exceed 12.5. The composition should weigh not less than 10.3 pounds per gallon. The composition should show no excessive settling in a freshly opened full container and should mix readily to a smooth homogeneous state, free from lumps and skins and hard caking even when stored for as long as six months. The composition will not burn or support combustion.

The above composition or solution may be applied to an old painted surface with either brush or spray, and no particular skill is required. After the solution is applied, it is allowed to set from two to ten hours, depending upon the number of coats of paint and primer to be stripped. The solution is then washed off with a clear stream of water at normal or high pressure, leaving the metal or other coated surface here.

It is characteristic of our novel paint remover that all of the old paint will be removed upon flushing the surface with a stream of water and this removed material will pass through a screen having eighteen meshes per inch each way, without clogging of the screen.

The clean surface is free of any greasy or waxy residue after the flushing operation. However, the treated surface appears to be protected in some way against oxidation or corrosion, as we have treated surfaces of metals which have stood under cover for three weeks after rinsing, without oxidation or corrosion of the surface which has been cleaned by our method.

The above composition may be successfully used on any ferrous metal and most non-ferrous metals with the exception of aluminum and magnesium. It may also be used successfully on silicate base materials such as glass, concrete and brick. Rubber is uneffected by its use.

Our improved composition usually penetrates many coats of old paint, eliminating the costly and arduous labor of scraping, burning and sanding off of old paint. Because of the simplicity of applying the coating, allowing it to stand, and then flushing off the old paint, it is possible to clean vehicles or other equipment and repaint them on an assembly-line basis. This affords a wide range of savings in time, labor and overall cost. The compound is easily applied by brush or spray, it clings to the surface treated with no material running off, and it washes off with a stream of cold water. Unskilled labor can do all of this work.

We have successfully used our paint remover on automobiles, trucks, farm equipment, railroad equipment, ships, storage tanks, machinery of all sorts and the interior walls of buildings.

This application is a continuation-in-part of our co-pending application Serial No. 331,506, filed January 15, 1953, for Paint Remover, now abandoned.

What we claim is:

1. A composition for removing paint and consisting of the following ingredients in approximately the percentages specified: caustic soda 21.80%, ethylene glycol monobutyl ether 5.51%, methylene chloride 8.13%, sodium oxalate 2.06%, sodium keryl benzene sulphonate 1.28%, methyl cellulose 0.79%, straw oil 3.12%, cornstarch 1.28% and the balance water.

2. A composition for removing paint and consisting of the following ingredients in approximately the percentages specified: caustic soda 21.80%, ethylene glycol monobutyl ether 5.51%, methylene chloride 8.13%, sodium oxalate 2.06%, sodium keryl benzene sulphonate 1.28%, thickener in the amount of approximately 1.25% selected from the group consisting of starch and flour, an evaporation retarder in the amount of approximately 3.00% of petroleum hydrocarbon oil, an adhesive in the amount of approximately 1% selected from the group consisting of methyl cellulose and glue, and the balance water.

(References on following page)

References Cited in the file of this patent

UNITED STATES PATENTS

| | | |
|---|---|---|
| 1,570,957 | Fluegel | Jan. 26, 1926 |
| 1,647,399 | Ellis | Nov. 1, 1927 |
| 2,247,365 | Flett | July 1, 1941 |
| 2,433,517 | Kuentzel | Dec. 30, 1947 |
| 2,619,468 | Zumbrunnen | Nov. 25, 1952 |
| 2,662,837 | Duncan | Dec. 15, 1953 |

FOREIGN PATENTS

| | | |
|---|---|---|
| 657,349 | Great Britain | Sept. 19, 1951 |

OTHER REFERENCES

Industrial Solvents, Mellan, Reinhold Pub. Co., New York, N. Y., 1939, pages 314–315.

Methocel, pages 17–23, pub. by Dow Chemical Co., Midland, Mich. (1949).